United States Patent [19]

Ladouceur

[11] Patent Number: 4,559,689

[45] Date of Patent: Dec. 24, 1985

[54] WHEEL COVER MANUFACTURING APPARATUS

[75] Inventor: Lawrence C. Ladouceur, Windsor, Canada

[73] Assignee: Randall Wheel Trim, Inc., Cincinnati, Ohio

[21] Appl. No.: 474,375

[22] Filed: Mar. 11, 1983

[51] Int. Cl.⁴ .............................................. B23P 11/00
[52] U.S. Cl. ................................ 29/243.52; 29/283.5; 29/802
[58] Field of Search ............... 29/243.52, 243.5, 283.5, 29/159 A, 802; 72/124, 125, 126

[56] References Cited

U.S. PATENT DOCUMENTS

| | | | |
|---|---|---|---|
| 2,689,595 | 9/1954 | Belada | 29/243.52 |
| 3,015,294 | 1/1962 | Lyon | 29/159 A X |
| 3,055,330 | 9/1962 | Lyon | 29/159 A |
| 3,096,738 | 7/1963 | Celovsky | 29/159 A |
| 3,210,841 | 10/1965 | Costello | 29/243.52 X |
| 3,395,441 | 8/1968 | Herbenar | 29/243.52 X |
| 3,444,606 | 5/1969 | Jones | 29/243.52 |
| 3,824,667 | 7/1974 | Smith et al. | 29/243.52 X |

FOREIGN PATENT DOCUMENTS 471721 2/1951 Canada ............................. 29/159 A Primary Examiner—Frederick R. Schmidt
Assistant Examiner—Steven P. Schad
Attorney, Agent, or Firm—Robert J. McNair, Jr.

[57] ABSTRACT

An apparatus for manufacturing a metal and plastic lightweight wheel cover. An annular riser supports the wheel cover assembly while several curling rolls roll curl the outermost flange of an outer ornamental member onto a lightweight plastic insert and retaining ring capturing the insert between the outer member and the retaining ring. The roll curling prevents relative rotation between the outer ornamental face and the retaining ring. The curling rolls embed a plurality of jagged edged barbs, formed on the retaining ring, in the insert. The barbs prevent the insert from rotating relative to the retaining ring.

2 Claims, 6 Drawing Figures

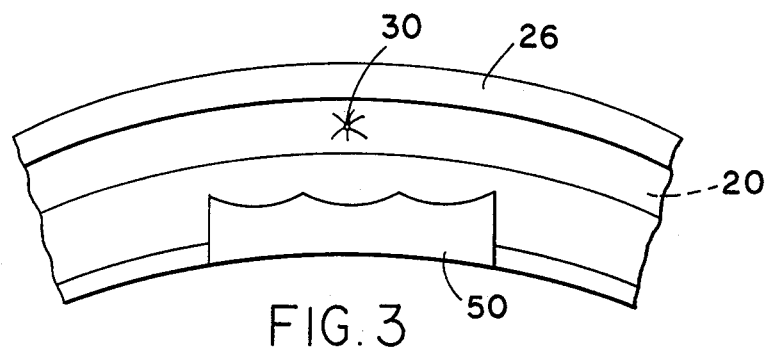
FIG. 3
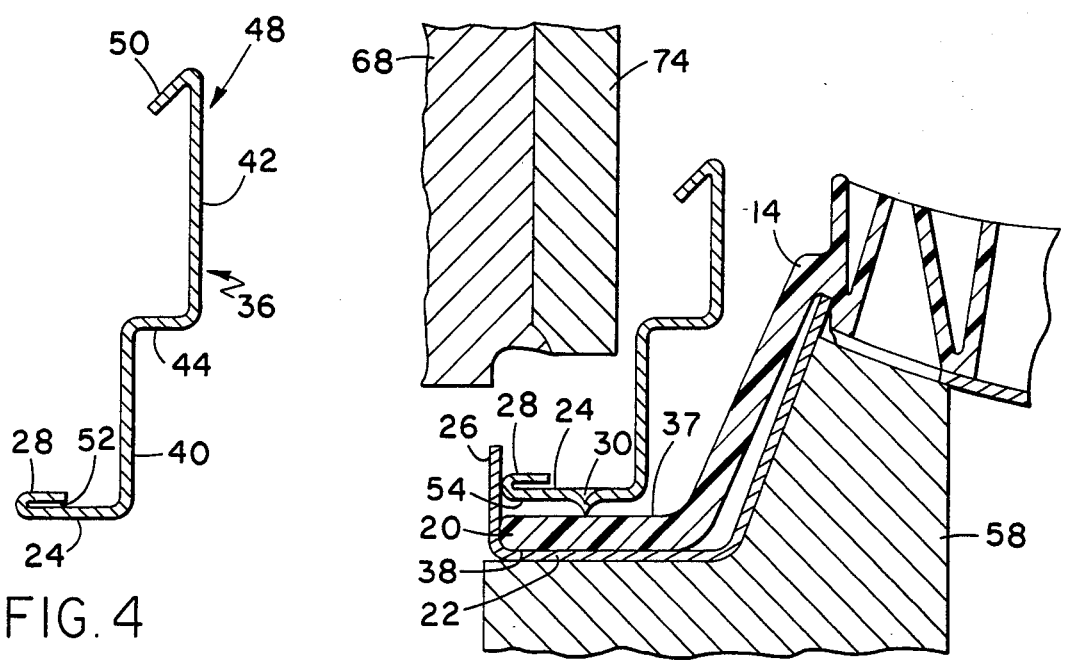
FIG. 4
FIG. 5

WHEEL COVER MANUFACTURING APPARATUS

BACKGROUND OF THE INVENTION

1 Field of the Invention

This invention relates to ornamental wheel covers and in particular, wheel covers that employ a plastic insert for lightweight reinforcement and decorative ornamentation of the wheel cover.

2 Description of the Prior Art

Use of ornamental wheel covers is widely known in the art. To effectuate cost savings and weight reduction in the wheel cover ornamentation, lightweight plastic inserts can be sued in the wheel cover assembly. In one type of wheel cover, the insert is fitted between a decorative, outer sheet metal member and a sheet metal retaining ring. The insert provides lightweight reinforcement of the wheel cover and in some cases, decorative outer ornamentation. The retaining ring includes a plurality of deflectable retaining fingers that rigidly engage the inner surface of the wheel rim upon installation of the wheel cover.

An attractive arrangement in assembling this type of wheel ornamentation is shown in U.S. Pat. Nos. 4,220,373 and 4,295,685. The outer edge of the outer metal ornamental member is generally folded around the outer edge of the insert and the inboard surface of the retaining ring flange to hold the assembly together. There is a limitation as to how much pressure can be applied to the outer edges of the wheel cover assembly. If too much pressure is applied, the outer perimeter of the plastic insert could be crushed and damaged. Thus, tolerances during assembly become critical. In these two patents, the retainer flange that is captured by the outer flange of the outer ornamental member is flat and directly abuts the outer peripheral flange of the insert. Thus, the movement of the forming rolls and the amount of pressure applied to fold the outer flange around the insert and the retainer must be critically monitored. Too much pressure may cause the outer edge of the insert to be crushed while too little pressure, which could result from wear in the forming rolls or tolerance variations, will not effectively prevent relative rotation of the elements as is essential for proper assembly. Even though it has been found that the metal on metal contact at the outer edges of the wheel cover between the outer ornamental member and the retaining ring tends to prevent their relative rotation, it is not uncommon for the forces in the wheel cover, due to acceleration and deceleration of the wheel, to cause relative slipping of the plastic insert. Several methods have been developed to prevent this.

In U.S. Pat. No. 4,220,373, an axially extending stop portion is integrally formed on the plastic insert to be received in a single notch that is formed on the retaining ring. Thus, not only is there additional fabrication steps required for both the plastic insert and the retaining ring, the insert and the retaining ring must be accurately aligned during assembly to effectuate the interference connection between the stop and the notch.

In U.S. Pat. No. 4,295,685 the plastic insert is preferably coupled to the outer ornamental member, rather than the retaining ring, by a set of screws that pass through the plastic insert and are threadably engaged in an outer hub cap, thus directly fastening the outer member to the plastic insert. Again, this requires additional fabrication of the plastic insert and additional alignment considerations during the wheel cover assembly. It should be noted that in one embodiment, the retaining ring is held in position by bending a flange on the outer member around the retaining ring. As mentioned, such a configuration would require critical monitoring during assembly and most likely some axially extending portions on the outer surface of the plastic insert that match the inside surface of the metal ornamental cover to prevent relative rotation of the elements.

Although the above patents illustrate the generally preferred methods of assembly, other patents disclose methods of directly connecting the plastic insert to the retaining means.

U.S. Pat. Nos. 3,252,738 and 4,007,967 use integral locking pins in the plastic insert fitted through holes in the retaining ring. The pins are fitted or riveted to prevent relative separation movement.

In U.S. Pat. Nos. 3,416,840, 3,601,449, 3,876,257 and 4,328,997, the retaining means has gripping fingers that engage an axially inwardly extending annular flange at the outer perimeter of the plastic insert to prevent rotation of the retaining means relative to the plastic insert.

As can be seen, all the cited wheel covers require specially formed and complicated inserts or retaining rings or both. In addition, the fabrication tolerances are critical. In arrangements that require the retaining ring to be inserted into or over a flange on the insert or requires the retaining ring to be mated with integral plastic pins or stops, variation in component diameters or stop locations due to low tolerances, wear in the forming rolls, or expansion and contraction of the work pieces, can result in an inability to assemble the wheel cover. Also, additional steps in the fabrication and assembly of the wheel cover may be required. For example, the fabrication of a retaining ring will require an extra operation if holes must cut in the retaining ring for the integral plastic pins of the plastic insert to fit therethrough.

SUMMARY OF THE INVENTION

It is an object of this invention to provide a manufacturing apparatus for assembling a metal and plastic lightweight wheel cover.

It is an additional object of this invention to provide a manufacturing apparatus for a metal and plastic lightweight wheel cover in which a plastic insert is sandwiched between an outer ornamental member and retaining assembly and will not rotate relative to either when the wheel cover is subjected to rotation forces resulting from acceleration or deceleration of a motor vehicle.

These and other objects of this invention are disclosed in the preferred embodiment of the invention which provides a manufacturing apparatus for the laminate structure of a metal and plastic lightweight wheel cover having a lightweight plastic reinforcing insert sandwiched between an outer ornamental member and inner an annular retaining ring. The preferred manufacturing apparatus positions the wheel cover assembly on an annular riser. The upper surface of the annular riser generally complements the outer periphery of the wheel cover assembly. A pad is positioned on the inboard surface of the wheel cover to help seat the assembly. The preferred embodiment further includes at least two curling rolls that roll curl an axially inwardly extending cylindrical flange at the outer edge of the outer ornamental member onto the insert and retaining means thus capturing the insert therebetween. Pressure is applied to the curling roll through an upper support member. During the roll curling operation, pressure is also applied by the curling rolls to be inboard surface of the retaining means. This surface has axially outwardly extending jagged edged barbs that are embedded in the plastic insert by the seating ring.

These and other objects of the invention will become apparent from the following description and drawings.

BRIEF DESCRIPTION OF THE DRAWINGS

FIG. 3 is a sectional view of the wheel cover taken through line 3—3 of FIG. 2.

FIG. 4 is a cross-section of the retaining ring immediately after roll forming.

FIG. 5 is a cross-section of the wheel cover in the preferred manufacturing apparatus, prior to the roll curling and seating operation.

DESCRIPTION OF THE PREFERRED EMBODIMENT

Figure 1:
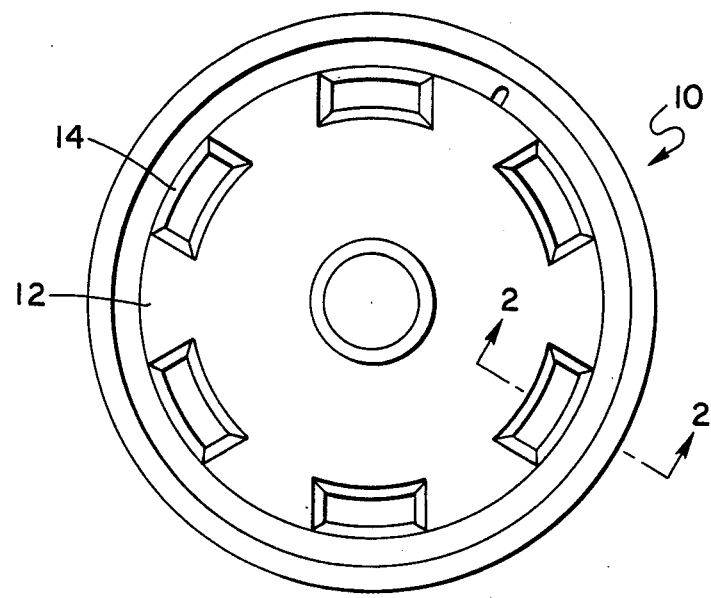
FIG. 1 is a front elevation of the wheel cover manufactured in accordance with the present invention as it appears when mounted on a wheel.
Figure 2:
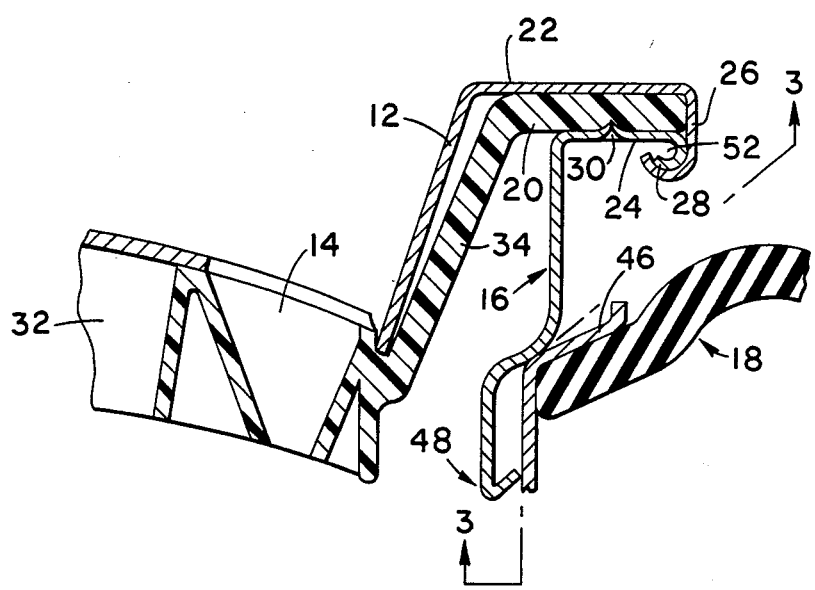
FIG. 2 is a sectional view of the wheel cover taken along line 2—2 of FIG. 1.

As seen in FIGS. 1, 2 and 3, the manufactured wheel cover 10 includes an outer ornamental member 12, lighweight reinforcing insert 14 and a retaining means 16. The wheel cover 10 is mounted on vehicle wheel 18. A generally annular radially extending flange 20 at the periphery of insert 14 is sandwiched between a second generally annular radially extending flange 22 on outer ornamental member 12 and third generally annular radially extending flange 24 on retaining means 16. A generally axially inwardly extending cylindrical flange 26 at the outer periphery of outer ornamental member 12 is curled around flange 20 of insert 14 and a generally radially inwardly extending flange 28 on retaining means 16. Retaining means flange 24 is provided with a plurality of axially outwardly extending jagged edged barbs 30 that are embedded in insert flange 20 during assembly. The frictional interference between outer member flange 26 and radially extending flange 28 will prevent relative rotation between outer ornamental member 12 and retaining means 16, while embedded jagged edged barbs 30 will prevent relative rotation between retaining means 16 and lightweight reinforcing insert 14. Details of the preferred wheel cover 10 components and assembly are discussed hereinafter.

The outer ornamental member 12 is generally formed out of sheet metal with a variety of decorative designs on its outer surface to add to the aesthetic qualities of wheel cover 10. Generally, the outer ornamental member 12 covers most of the lightweight insert 14. As an alternative, an outer ornamental member can be limited to cover only the outer peripheral region of wheel cover 10 so that the exposed central region 32 of the insert 14 will provide the decorative design. In such a case, the outer ornamental member 12 can be stamped from a flat annular plate or roll formed from a flat metal strip that is welded at its ends to form a ring. The peripheral area of outer ornamental member 12 has a generally annular radially extending flange 22 that generally complements flanges 20 of lightweight insert 14. The extreme outer periphery of outer ornamental member 12 has a generally axially inwardly extending cylindrical flange 26, as seen in its unassembled form in FIG. 5.

The lightweight insert 14 is generally formed of resilient, high impact plastic or similar material and is provided with a rigid structure to reinforce the wheel cover 10 structure. The central area of the insert 32 is generally dish shaped. The outer periphery of insert 14 has a generally annular radially extending flange 20 extending outward from a generally axially outwardly radially extending flange 34. Flange 20 has an inboard surface 37 and an outboard surface 38.

In the preferred manufactured wheel cover 10, the retaining means 16 is a retaining ring 36 generally formed by stamping or roll forming a strip of sheet metal and welding the ends together to form a ring. FIG. 4 shows the preferred cross-section of retaining ring 36 after the forming operation. The retaining ring 36 provides for generally axially extending flanges 40 and 42 separated by a generally radially outwardly extending shoulder flange 44. Shoulder flange 44 abuts wheel rim 46 when wheel cover 10 is fully installed on wheel 18. Retaining ring 36 also provides an integral retaining structure indicated generally at 48. Retaining structure 48 is comprised of circumferentially spaced, radially resilient, deflectable retaining fingers 50 that are generally known in the art. Fingers 50 will engage and retainingly secure the wheel cover 10 to the wheel rim 46.

Retaining ring 36 is also provided with an annular radially extending flange 24 joined to an inwardly extending annular surface 28 forming channel 52 therebetween.

After retaining ring 36 is formed but prior to wheel cover 10 assembly, a plurality of axially outwardly extending sharp edged barbs 30 are formed in the outboard surface 54 of flange 24 as shown in FIG. 5. These barbs are easily formed by spiking the retaining ring 36 with a nail punch or some other means that will penetrate through flange 24.

During the assembly of wheel cover 10, the outer periphery of plastic insert 14 is sandwiched between retaining ring 36 and outer ornamental member 12 as shown in FIG. 5. Flange 26 of outer ornamental member 12 will align the components of wheel cover 10 prior to the final assembly operation.

Figure 6:
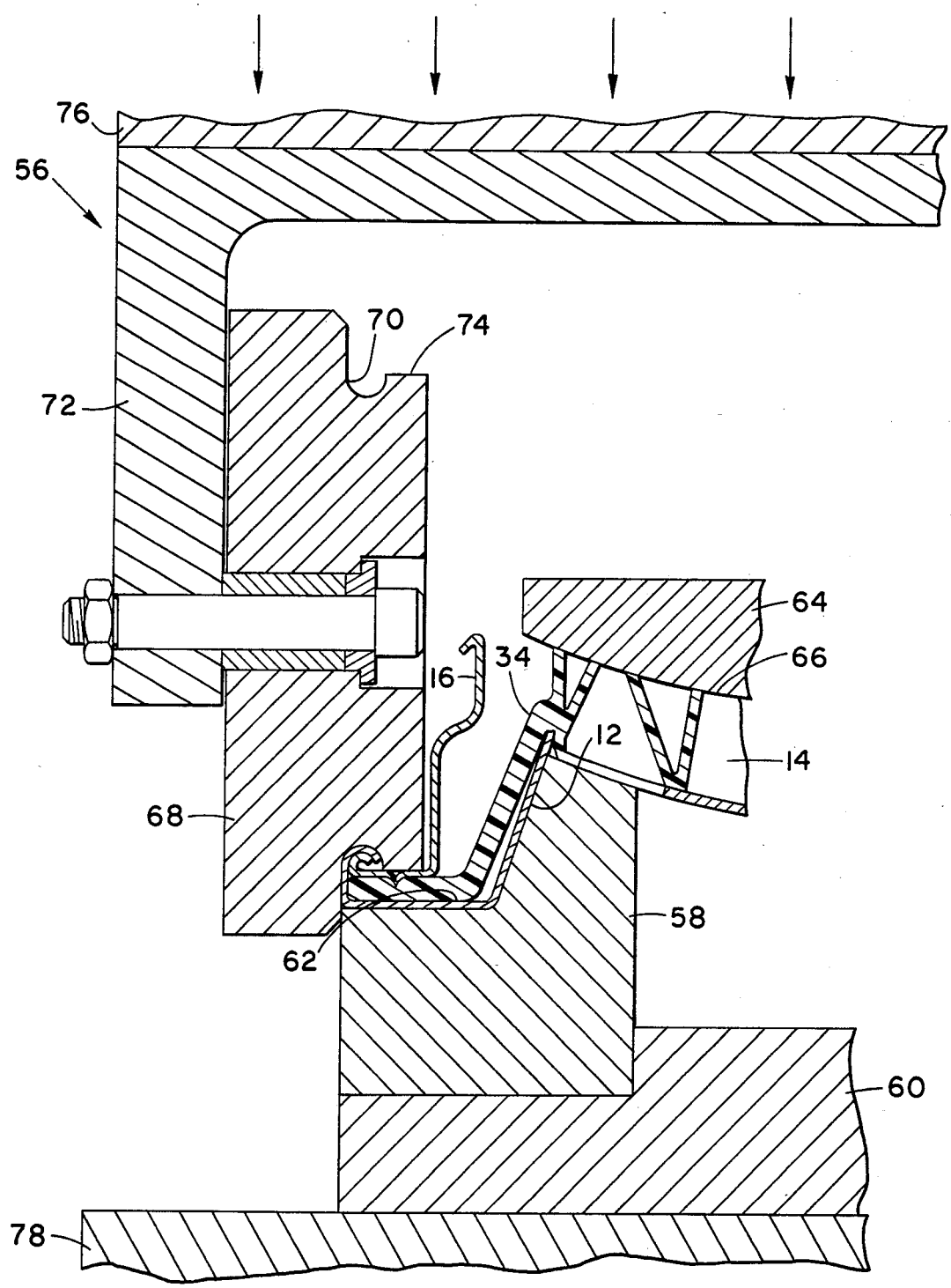
FIG. 6 is a partial cross-section of the preferred manufacturing apparatus.

The wheel cover 10 assembly is placed in the preferred manufacturing apparatus, generally indicated at 56. Apparatus 56 is mounted on the upper support means 76 and lower support means 78 of a typical heavy duty press (not shown) of the type that uses hydraulic, pneumatic, or electrical controls. The outer periphery of wheel cover 10 assembly is positioned on an annular riser 58, which is supported by a disc-shaped riser 60. Surface 62 of annular riser 58 generally complements the outer periphery of the wheel cover assembly. Pad 64 is positioned on the inboard surface 66 of insert 14, to help seat the wheel cover 10 assembly on riser 58. At least two curling rolls 68 located at opposite ends of manufacturing apparatus 56 rotate around the perimeter of wheel cover 10 and move from an open position as shown in FIG. 5 to a closed position as shown in FIG. 6, forcing surface 70 of curling roll 68 to roll curl cylindrical flange 26 and to fixedly join outer ornamental member 12 and retaining ring 36 so as to prevent their relative rotation and to capture plastic insert 14 therebetween. Pressure is applied in the direction indicated by the arrows in FIGS. 5 and 6 to curling roll 68 by upper support 76 through curling roll support 72. During the roll curling operation, pressure is applied by surface 74 of curling roll 68 to flange 24 of retaining ring 36 in the general vicinity of barbs 30 so that barbs 30 penetrate and embed in the inboard surface 37 of flange 20 of plastic insert 14 thus preventing insert 14 from rotating relative to retaining ring 36.

Although it is recognized that retaining ring 36 does not have to have flange 28 in order for wheel cover 10 to be functional, in the preferred manufactured wheel cover assembly, curling roll 68 curls cylindrical flange 26 so that it is in intimate contact with retaining ring flange 28. Flange 28 can deflect into channel 52 without contacting flange 24, thus reducing the possibility of crushing flange 20 of insert 14. Slight variations in the distance curling roll 68 moves will not affect the overall effectiveness of manufacturing apparatus 56. In addition, the resiliency of flange 28 will cause it to move in an axially inward direction after the roll curling operation has forced it in an axially outward direction into channel 52. As a result, there will be great frictional forces at the interface between flanges 26 and 28.

While the preferred embodiment of the invention has been illustrated and described herein, the variations will become apparent to one of ordinary skill in the art. Accordingly, the invention is not to be limited to the specific embodiment illustrated and described herein, and the true scope and spirit of the invention are to be determined by reference to the amended claims.

The embodiments of the invention in which an exclusive property or privilege is claimed are defined as follows:

1. An apparatus for forming a lightweight wheel cover comprised of a laminate structure including an outer ornamental member, a plastic insert and a retaining means provided with a plurality of jagged edge barbs, which apparatus comprises:
   (a) upper and lower support means;
   (b) an annular riser mounted on the lower support means for supporting the wheel cover and including an upper surface complementing the outwardly facing surface of the outer peripheral region of the wheel cover;
   (c) a plurality of curling rolls mounted on the upper support means, each curling roll being positioned radially outwardly of and above the wheel cover support means for capturing the plastic insert between the outer ornamental member and the retaining means, each curling roll including:
      i. a first outwardly disposed surface configured for roll curling outer ornamental member and the retaining means inwardly, and
      ii. a second inwardly disposed surface configured for applying pressure onto the retaining means to cause the jagged edge barbs to penetrate and embed within the plastic insert; and
   (d) the upper surface of the annular riser being configured to complement and be substantially entirely engaged by the outwardly facing surface of the outer peripheral region of the wheel cover.

2. The apparatus of claim 1 further including a pad for engaging the plastic insert to seat the wheel cover on the upper surface of the annular riser.

* * * * *